(12) United States Patent
Matheny

(10) Patent No.: US 7,401,981 B2
(45) Date of Patent: Jul. 22, 2008

(54) BEARING DAMPER HAVING COILED WIRE

(75) Inventor: Alfred P. Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 269 days.

(21) Appl. No.: 11/234,503

(22) Filed: Sep. 23, 2005

(65) Prior Publication Data

US 2007/0009193 A1    Jan. 11, 2007

Related U.S. Application Data

(60) Provisional application No. 60/697,226, filed on Jul. 7, 2005.

(51) Int. Cl.
*F16C 27/04* (2006.01)
*F16C 33/58* (2006.01)

(52) U.S. Cl. ........................................ 384/535; 384/513

(58) Field of Classification Search ......... 474/502–513, 474/516, 518, 535–538, 582; 74/502.3, 574
See application file for complete search history.

(56) References Cited

U.S. PATENT DOCUMENTS

| | | | |
|---|---|---|---|
| 964,859 A | 7/1910 | Garman | |
| 1,124,256 A | 1/1915 | Barker | |
| 2,588,636 A * | 9/1952 | Korsgren | 384/536 |
| 2,733,108 A * | 1/1956 | Cowles | 384/582 |
| 2,926,051 A | 2/1960 | Cazier et al. | |
| 3,097,895 A | 7/1963 | Matt | |
| 3,101,979 A | 8/1963 | Mard | |
| 3,304,138 A * | 2/1967 | Sampatacos | 384/516 |
| 3,344,682 A * | 10/1967 | Bratz | 74/502.3 |
| 3,348,796 A | 10/1967 | Baratoff et al. | |
| 3,499,691 A | 3/1970 | Baler | |
| 4,257,495 A * | 3/1981 | de Brie Perry | 384/215 |
| 4,392,751 A | 7/1983 | Ida et al. | |
| 4,506,998 A | 3/1985 | Showalter | |
| 4,509,871 A * | 4/1985 | Herzog et al. | 384/513 |
| 4,647,227 A | 3/1987 | Clebant | |
| 4,728,088 A | 3/1988 | Smith | |
| 5,197,807 A | 3/1993 | Kuznar | |
| 5,315,892 A * | 5/1994 | Gabas et al. | 74/502.3 |
| 5,380,100 A | 1/1995 | Yu | |
| 5,452,957 A | 9/1995 | Duggan | |
| 5,868,503 A * | 2/1999 | Bade | 384/536 |
| 6,524,010 B1 * | 2/2003 | Derman | 384/513 |
| 6,878,873 B2 | 4/2005 | Fryberger, Jr. et al. | |
| 2002/0063368 A1 * | 5/2002 | Kabir | 267/147 |

* cited by examiner

*Primary Examiner*—Marcus Charles
(74) *Attorney, Agent, or Firm*—John Ryznic

(57) ABSTRACT

A bearing damper includes a coiled wire wrapped around projections formed on an outer race of the bearing, and supported by a casing having projections extending toward the coiled wire. Projections on the outer race are aligned with recesses on the casing, while projections on the casing are aligned with recesses in the outer race so that the coiled wire can flex between the projections that support the wire and provide a damping function. The coiled wire is formed of a plurality of strands. Flexing of the wire causes adjacent strands to rub and dissipate energy from the vibrations. The tension in the coiled wire can be adjusted in order to vary the damping capability of the bearing damper.

13 Claims, 2 Drawing Sheets

BEARING DAMPER HAVING COILED WIRE

CROSS-REFERENCE TO RELATED APPLICATIONS

This application claims the benefit to earlier filed Provisional application 60/697,226 filed on Jul. 7, 2005.

BACKGROUND OF THE INVENTION

1. Field of the Invention

The present invention relates to a damper for a bearing and more specifically to a damper that can be used under a wide range of temperatures and vibration loads, and in addition to a damper for a bearing in which the damping characteristics can be adjusted.

2. Description of the Related Art Including Information Disclosed Under 37 CFR 1.97 and 1.98

Elastomeric supported and flexible fluid filled dampers are well known in the art of dampers used in bearings. An electrometrically supported bearing like U.S. Pat. No. 4,506,998 issued to Showalter on May 26, 1985 uses a elastomeric pad positioned between the bearing and a casing, the pad providing damping capabilities for the bearing because of the soft material. However, the elastomeric (plastic) material used in the damping pad is limited to low temperature environments that will not melt or degrade the plastic material.

Fluid filled elastomeric dampers are known like that in U.S. Pat. No. 4,257,495 issued to de Brie Perry on Mar. 24, 1981 in which an elastomeric bag filled with a liquid is used to provide the damping capability. However, the plastic bag suffers from the same temperature limitation as described above, in addition to the problem of the liquid leaking out and causing problems with the bearing or its surrounding structure.

U.S. Pat. No. 3,097,895 issued to Matt on Jul. 16, 1963 shows a bearing suspension that uses a plurality of axial aligned solid or tubular resilient rods to support the bearing. The rods can withstand higher temperature environments than elastomeric materials and do not suffer from potential liquid leakage.

It is an object of the present invention to provide a bearing support that is oil free, is elastomeric free, and can be used in high temperature environments and under large damping forces.

SUMMARY OF THE INVENTION

The present invention provides a damper for a bearing in which a coil of wire is wrapped around a bearing outer race, the coil wire being supported by alternating projections formed on the bearing race and a casing in order than the coil wire will provide a flexible support for the bearing to provide the damping capability while also supporting the bearing under high temperature environments. The coiled wire is formed of a plurality of strands, and the flexing of these strands causes adjacent strands to rub. This rubbing of adjacent strands produces the damping effect. The bearing and damper structure provide for the bearing outer race to be axially moveable with respect to the casing in order to vary the tension in the wire coil and thus vary the damping capability.

DETAILED DESCRIPTION OF THE INVENTION

Figure 1:
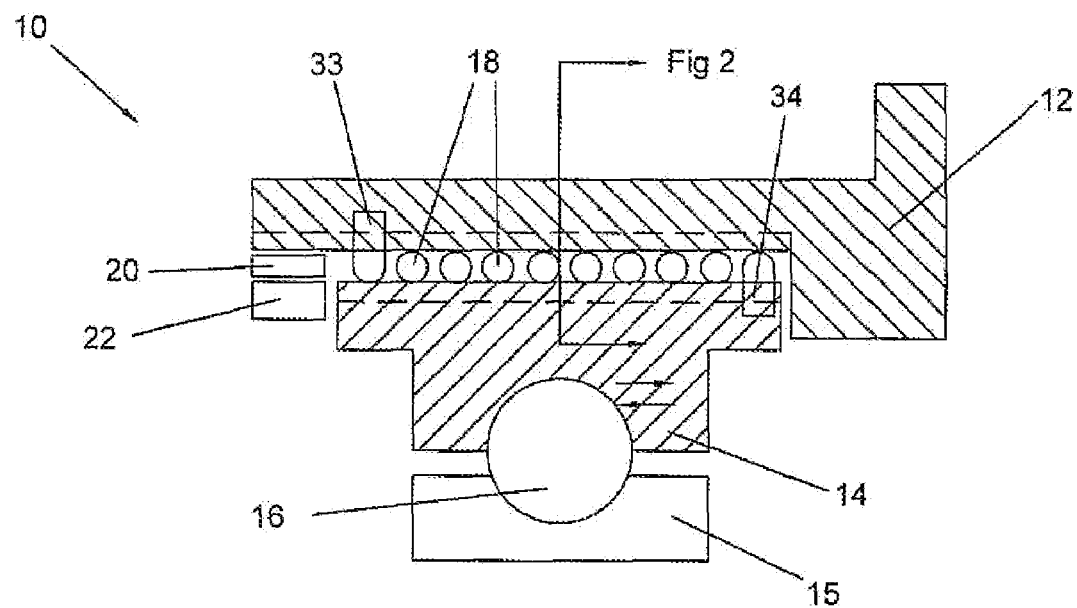
FIG. 1 shows a cross section view of the bearing with the coiled wire damper.

The bearing damper assembly 10 of the present invention is shown in FIG. 1 and includes an outer case 12, a bearing outer race 14, a bearing inner race 15, a ball bearing 16, and a coiled wire 18 wrapped around the bearing outer race 14. Annular retainers 20 and 22 are secured to the outer case 12 to hold the bearing portion in place.

Figure 2:
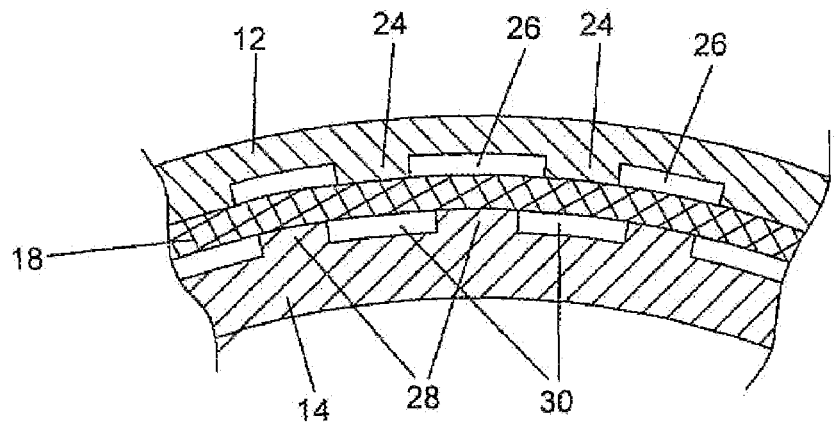
FIG. 2 shows a cross section of the damper portion of the bearing in which a wire is pinched between an outer damper case and an outer bearing race.

The support for the coiled wire is shown in FIG. 2, where the outer case 12 and the outer race 14 both include finger extensions 24 and 28 with recesses 26 and 30 formed between these finger extensions. A inward finger extension 24 of the outer case is aligned with a recess 30 of the outer race 14, and an outward finger extension 28 of the outer race 14 is aligned with a recess 26 of the outer case 12. The coiled wire is supported between the fingers 24 and 28 of the outer case 12 and the outer race 14. The wire is wound tight around the outer race 14 in order to provide enough tension in the wire 18 to support the outer case and provide the damping affect required. The wire 18 can be a single strand of steel or any other material having the desired properties to provide damping, or can be of a plurality of strands such as in a cable. The diameter of the wire and the number of loops the wire is wrapped around the outer race 14 can be varied to control the damping affect of the bearing assembly. The coiled wire includes ends 33 and 34 that are turned inward on one end and turned outward on the other end of the coiled wire. The wire end 33 and 34 fit within holes formed in the outer case 12 and the outer race 14 to secure the coiled wire to the hearing support assembly with a desired tension that provides for the damping effect.

Figure 4:
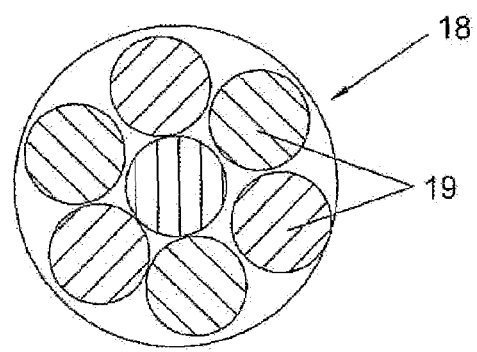
FIG. 4 shows a close-up view of the wire comprising a plurality of strands.

FIG. 4 shows the wire used in the preferred embodiment of the present invention. A solid wire can be used. However, it is preferred to use a wire 18 made up of a plurality of strands 19 as shown in FIG. 4. Each strand 19 will rub against an adjacent strand when the wire 18 is flexed due to the vibration induced against the wire coil. Rubbing of adjacent strands 19 will dissipate the energy of the vibration. This rubbing of adjacent strands 19 is what produces the desired damping of the present invention.

The bearing in the present invention can be any type of well known bearing, such as a ball bearing as shown in the Figures, or a roller bearing. A friction bearing can even be used.

Figure 3:
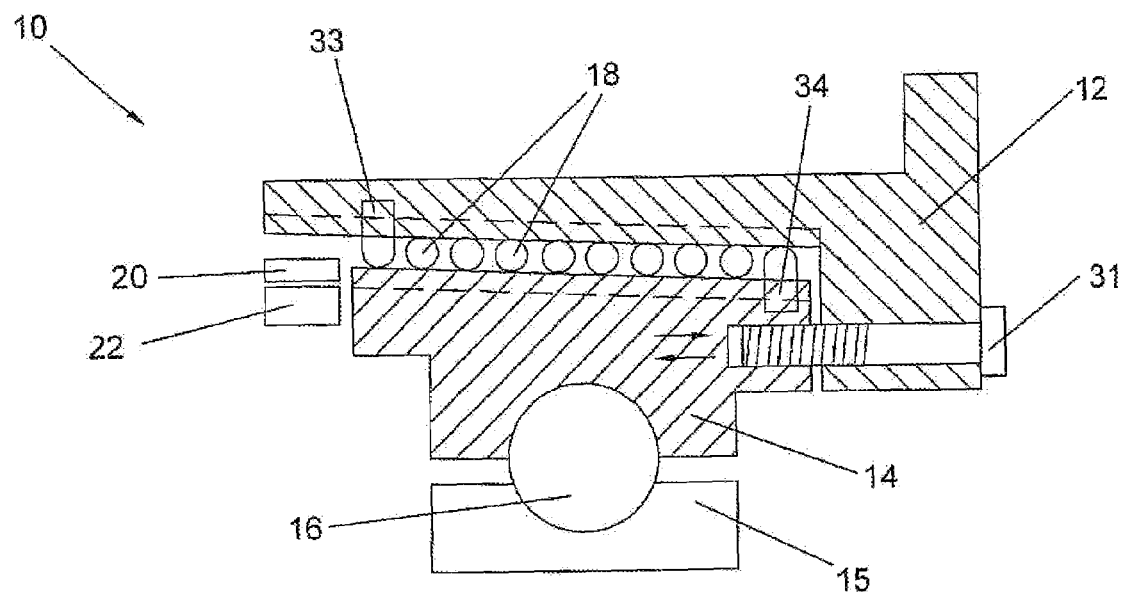
FIG. 3 shows a cross section of a second embodiment of the bearing with a coiled wire damper, where the damper portion includes coil wire support surfaces offset from a parallel to the rotational axis of the bearing for the purpose of adjusting the tension in the wire to affect a dampening rate.

A second embodiment of the present invention is shown in FIG. 3. In this embodiment, the bearing damper 10 includes structure to allow for the tension in the coiled wire to be adjusted. Adjusting the tension in the coiled wire will affect the damping capability of the coiled wire. The structure to provide this function is to provide for the fingers 24 and 28 to have the wire contact surfaces that are aligned along a line offset from a line parallel to the rotational axis of the bearing. To adjust the tension in the wire, the outer race 14 is moved along a direction of the arrows (shown in FIG. 3) with respect to the outer case 12. This movement varies the spacing or distance between the wire contact surfaces of the fingers 24 and 28. The amount that the wire 18 is pinched between the fingers is varies, and thus the tension in the wire is varies. Varying the tension in the wire 18 will affect the damping capability of the bearing damper 10.

The structure for adjusting the position of the outer race 14 with respect to the outer case 12 can be a plurality threaded bolt members 31 passing through the outer case 12 and into the outer race 14. Rotation of the threaded bolts would cause the outer race 14 to move along the direction of the arrows depending upon the direction of rotation of the threaded bolts.

In still another embodiment, the coil wire can be secured to the casing at one end of the wire and to the bearing outer race on the other end of the coil wire. The outer race of the bearing can be supported by the casing such that the outer race can be rotated with respect to the casing. Relative rotation between the casing and the outer race would provide another way of adjusting the tension in the coil wire, and therefore adjusting the damping capability of the damper. A means to lock the outer race in position relative to the casing—such as a V-shaped key and a V-shaped groove to fit the key—would provide a means to prevent relative rotation of the two members. This embodiment would eliminate the need for the beveled fingers of the FIG. 3 embodiment.

Also, the wire can be made of a metallic material for use in high temperature environments, or can be made of an elastomeric material for use in low temperature environments if desired.

I claim the following:

1. A bearing damper comprising:
   A bearing support;
   An outer race of a bearing;
   A plurality of inward extending projections on the bearing support, the inward extending projections forming recesses between adjacent inward extending projections;
   A plurality of outward extending projections on the outer race, the outward extending projections forming recesses between adjacent outward extending projections;
   The inward extending projections being aligned over the recesses on the outer race;
   The outward extending projections being aligned over the recesses on the bearing support; and,
   A coiled wire supported by the inward extending projections and the outward extending projections under tension.

2. The bearing damper of claim 1, and further comprising:
   The coil wire is a solid metal wire.

3. The bearing damper of claim 1, and further comprising:
   The coil wire comprises a plurality of strands.

4. The bearing damper of claim 1, and further comprising:
   One end of the coil wire is secured to the bearing support and the other end of the coil wire is secured to the outer race.

5. The bearing damper of claim 1, and further comprising:
   The coil wire extends substantially from the front end of the outer race and to the rear end of the outer race.

6. The bearing damper of claim 5, and further comprising:
   Means to rotate the outer race with respect to the bearing support in order to alter the tension in the wire.

7. The bearing damper of claim 1, and further comprising:
   The inward extending projections and the outward extending projections both support the coil wire along a line substantially parallel to a rotational axis of the bearing.

8. The bearing damper of claim 1, and further comprising:
   The inward extending projections and the outward extending projections support the coil wire along a line substantially angled to a rotational axis of the bearings; and,
   Means to axial move the outer race with respect to the bearing support to alter the tension in the wire.

9. The bearing damper of claim 1, and further comprising:
   The bearing damper is capable of being used in a high temperature environment in which an elastomeric material would melt.

10. The bearing damper of claim 1, and further comprising:
    The coiled wire absorbs vibrations from the bearing through tension in the wire.

11. A process for damping a bearing comprising the steps of:
    Securing one end of a coil wire to a bearing support;
    Securing the opposite end of the coil wire to an outer race such that the coil wire is held in tension; and,
    Supporting the coil wire between the bearing support and the outer race such that as radial displacement of the outer race with respect to the bearing support produces a change in the tension of the coil wire.

12. The process for damping a bearing of claim 11, and further comprising the step of:
    Adjusting the tension of the coil wire by moving the outer race in an axial direction with respect to the bearing housing.

13. The process for damping a bearing of claim 11, and further comprising the step of:
    Adjusting the tension of the coil wire by rotating the outer race with respect to the bearing housing.

* * * * *